United States Patent
Brown

(10) Patent No.: US 11,475,435 B2
(45) Date of Patent: Oct. 18, 2022

(54) METHOD AND SYSTEM FOR GENERATING DIGITAL WALLET ACCOUNTS

(71) Applicant: JPMorgan Chase Bank, N.A., New York, NY (US)

(72) Inventor: Jacob Barry Paul Brown, Tampa, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 295 days.

(21) Appl. No.: 16/574,489

(22) Filed: Sep. 18, 2019

(65) Prior Publication Data

US 2020/0090163 A1   Mar. 19, 2020

Related U.S. Application Data

(60) Provisional application No. 62/733,386, filed on Sep. 19, 2018.

(51) Int. Cl.
*G06Q 20/36* (2012.01)
*G06Q 20/32* (2012.01)

(52) U.S. Cl.
CPC ..... *G06Q 20/3672* (2013.01); *G06Q 20/3274* (2013.01); *G06Q 20/363* (2013.01); *G06Q 20/3678* (2013.01)

(58) Field of Classification Search
None
See application file for complete search history.

(56) References Cited

U.S. PATENT DOCUMENTS

| | | | | |
|---|---|---|---|---|
| 6,259,777 | B1* | 7/2001 | Kawecki | H04M 15/81 379/135 |
| 6,868,408 | B1* | 3/2005 | Rosen | G06Q 20/10 705/64 |
| 7,133,845 | B1* | 11/2006 | Ginter | G06Q 20/02 705/52 |
| 7,568,217 | B1* | 7/2009 | Prasad | H04L 63/102 726/3 |
| 9,898,781 | B1* | 2/2018 | Silverman | G06Q 20/223 |
| 10,726,401 | B2* | 7/2020 | Hertel | G06Q 30/0222 |
| 10,769,622 | B2* | 9/2020 | Daniel | G06Q 20/12 |
| 10,885,410 | B1* | 1/2021 | Rule | G06Q 20/3274 |
| 10,909,544 | B1* | 2/2021 | Osborn | G06Q 20/352 |

(Continued)

OTHER PUBLICATIONS

Alhothaily et al (QuickCash: Secure Transfer Payment Systems) (Year: 2017).*

*Primary Examiner* — John W Hayes
*Assistant Examiner* — Mamon Obeid
(74) *Attorney, Agent, or Firm* — Greenblum & Bernstein, P.L.C.

(57) ABSTRACT

A method for generating codes that correspond to accounts associated with a digital wallet is provided. The method includes obtaining a primary account identifier from a user; receiving a request from the user to generate a secondary account; generating the secondary account; generating a code representing the secondary account; associating the code with the primary account identifier; and transmitting information that indicates the association between the code and the primary account identifier to a payment processor. The method may also include the use of pooled accounts through an aggregation of secondary accounts from different users.

18 Claims, 9 Drawing Sheets

(56) References Cited

U.S. PATENT DOCUMENTS

| | | | |
|---|---|---|---|
| 2002/0069177 A1* | 6/2002 | Carrott | G06Q 20/3674 705/64 |
| 2002/0133467 A1* | 9/2002 | Hobson | G06Q 20/04 705/64 |
| 2003/0182242 A1* | 9/2003 | Scott | G06Q 20/32 705/65 |
| 2004/0019571 A1* | 1/2004 | Hurwitz | G06Q 20/367 705/65 |
| 2004/0083184 A1* | 4/2004 | Tsuei | G06Q 20/383 705/74 |
| 2004/0181453 A1* | 9/2004 | Ray | G07F 7/1008 705/16 |
| 2004/0260653 A1* | 12/2004 | Tsuei | G06Q 20/342 705/54 |
| 2005/0102188 A1* | 5/2005 | Hutchison | G06Q 20/10 705/26.1 |
| 2005/0192896 A1* | 9/2005 | Hutchison | G06Q 30/04 705/40 |
| 2005/0232423 A1* | 10/2005 | Horvitz | G06F 21/6218 380/255 |
| 2005/0273407 A1* | 12/2005 | Black | G06Q 40/06 705/35 |
| 2008/0201265 A1* | 8/2008 | Hewton | G06Q 20/40145 235/492 |
| 2009/0094157 A1* | 4/2009 | Reno | G06Q 40/12 705/44 |
| 2011/0155799 A1* | 6/2011 | Meszaros | G06Q 20/102 235/379 |
| 2011/0208600 A1* | 8/2011 | Aharoni | G06Q 20/3274 705/16 |
| 2012/0041881 A1* | 2/2012 | Basu | G06Q 20/38215 705/67 |
| 2012/0130794 A1* | 5/2012 | Strieder | G06Q 30/0226 705/14.27 |
| 2012/0331571 A1* | 12/2012 | Vandervort | G06F 21/6209 726/30 |
| 2013/0024516 A1* | 1/2013 | Blinder | G06Q 50/01 709/204 |
| 2013/0144808 A1* | 6/2013 | Mercier | G06Q 40/06 705/36 R |
| 2014/0006276 A1* | 1/2014 | Grigg | G06Q 20/322 705/41 |
| 2014/0025958 A1* | 1/2014 | Calman | G06F 21/6218 713/189 |
| 2014/0129428 A1* | 5/2014 | Tyler | G06Q 20/3276 705/39 |
| 2014/0344153 A1* | 11/2014 | Raj | G06Q 20/385 705/44 |
| 2014/0365284 A1* | 12/2014 | Upadhya | G06Q 30/0241 705/14.4 |
| 2015/0242643 A1* | 8/2015 | Hankins, Jr. | H04L 63/0428 726/26 |
| 2016/0224977 A1* | 8/2016 | Sabba | G06Q 20/385 |
| 2016/0239842 A1* | 8/2016 | Cash | G06Q 20/3821 |
| 2017/0141926 A1* | 5/2017 | Xu | H04L 9/3066 |
| 2017/0200160 A1* | 7/2017 | Kumar | G06Q 20/227 |
| 2018/0337951 A1* | 11/2018 | Agarwal | H04L 63/20 |
| 2019/0065585 A1* | 2/2019 | Goenka | G06Q 10/00 |
| 2019/0080309 A1* | 3/2019 | Goodwin | G06Q 20/401 |
| 2019/0199702 A1* | 6/2019 | Zheng | G06Q 10/083 |
| 2019/0213594 A1* | 7/2019 | Phillips | G06F 21/34 |
| 2020/0090163 A1* | 3/2020 | Brown | G06Q 20/3672 |
| 2020/0302087 A1* | 9/2020 | Parkinson | G06F 21/6245 |
| 2020/0327288 A1* | 10/2020 | Shvartsman | G06F 21/32 |
| 2020/0357082 A1* | 11/2020 | Malik | G06Q 20/3821 |
| 2020/0396065 A1* | 12/2020 | Gutierrez-Sheris | H04L 9/3239 |
| 2021/0158350 A1* | 5/2021 | Gaddam | H04L 63/102 |
| 2021/0174352 A1* | 6/2021 | Kenney | G06Q 20/3224 |
| 2021/0272151 A1* | 9/2021 | Smrzlic | G06Q 30/0235 |

* cited by examiner

ME THOD AND SYSTEM FOR GENERATING
DIGITAL WALLET ACCOUNTS

CROSS-REFERENCE TO RELATED
APPLICATIONS

This application claims the benefit of U.S. Provisional Patent Application Ser. No. 62/733,386, filed Sep. 19, 2018, which is hereby incorporated by reference in its entirety.

BACKGROUND

1. Field of the Disclosure

This technology generally relates to methods and systems for providing information that relates to a user account, and more particularly, to methods and systems for generating codes that correspond to accounts associated with a digital wallet.

2. Background Information

Access to funds for issuing digital payments are typically linked to a single bank account or linked accounts, such as a checking account and a savings account. Opening additional accounts may be difficult and require intervention by a banking professional. Furthermore, the ability to organize and allocate funds for different purposes is tedious or not possible using existing banking applications. In some digital payment applications, a digital wallet may be linked to a bank account in order to initiate a digital transfer of funds to another party with the same payment application, presumably similarly linked to the receiving party's bank account. These applications are commonly referred to as digital wallets. However, such configurations are limited to an account-to-account transfer.

As the world grows increasingly reliant on digital transactions, there is a need for increased flexibility in the transfer and receipt of digital payments. A drawback to the developing digital payment infrastructure is the inability to transfer funds to people outside of a single network or application. For instance, tipping a street performer or waiter is an easy task using paper money or coins, however, using a digital transfer of funds can become needlessly complex. Issues may arise with regard to the security of transferring funds to a stranger, and a user may be hesitant to connect their bank account information to an untrusted source. Additionally, there may be compatibility issues that arise when one party seeking payment has a different application or device that is incompatible with the party seeking to transfer funds.

Additional issues arise when a user only has one bank account but would like to keep funds received from one source separate from another. For instance, a person would like to keep the money they received from their job as a waiter separate or categorized separately from the money they received selling handmade goods at a craft fair. Typically, a user may only have a checking account and a savings account, and a digital payment application may need to be separately configured to send money to different accounts.

It is therefore appreciated that a need exists for a secure and simple way to transfer funds between parties into a customizable digital wallet.

SUMMARY

The present disclosure, through one or more of its various aspects, embodiments, and/or specific features or sub-components, provides, inter alia, various systems, servers, devices, methods, media, programs, and platforms for generating codes that correspond to accounts associated with a digital wallet.

According to an aspect of the present disclosure, a method for generating codes that correspond to accounts associated with a digital wallet is provided. The method is implemented by at least one processor of a client device. The method includes: obtaining at least one primary account identifier from a first user; receiving a request from the first user to generate at least one secondary account; generating the at least one secondary account; generating at least one code representing the at least one secondary account; associating the generated at least one code with the at least one primary account identifier; and transmitting information that indicates the association between the at least one code and the at least one primary account identifier to a payment processor.

In accordance with an exemplary embodiment, the at least one code includes a hash value generated by using at least one Secure Hash Algorithm (SHA) that include at least one of SHA-1, SHA-2, and SHA-3.

In accordance with an exemplary embodiment, the hash value is created using one-way functions that are not reversible.

In accordance with an exemplary embodiment, a first one of the at least one secondary account is included in a pool of accounts that corresponds to different users, the pool being associated with a pool-specific code, and wherein the pool of accounts is maintained by an administrator that is authorized to disburse funds to participants, establish distribution parameters, add participants, and removes participants.

In accordance with an exemplary embodiment, the distribution parameters include at least one of a seniority parameter, an ownership parameter, a participation parameter, a shift type parameter, and job title parameter.

In accordance with an exemplary embodiment, the transaction process includes receiving, from the first user, a request to initiate a transaction and initiating the requested transaction.

In accordance with an exemplary embodiment, the initiating a transaction further comprises: generating a machine readable symbol representing the at least one code, wherein the machine readable symbol includes at least one of a bar code, a linear barcode, a two-dimensional (2-D) matrix barcode, and a Quick Response (QR) code; and displaying the generated machine-readable symbol; and wherein, when the transaction is completed, the method further comprises: receiving a confirmation from the payment processor that the transaction is completed, wherein the confirmation includes at least one of an audible alert, a visual alert, and a notification message.

In accordance with an exemplary embodiment, the initiating a transaction further comprises: scanning a displayed machine-readable symbol; and transmitting a transaction message to the payment processor, wherein the transaction message includes the machine-readable symbol and instructions to transfer a predetermined amount of funds into the at least one secondary account; and wherein, when the transaction is completed, the method further comprises: receiving confirmation from the payment processor that the transaction is completed, wherein the confirmation includes at least one of an audible alert, a visual alert, and a notification message.

In accordance with an exemplary embodiment, the client device includes at least one of a mobile computing device, a cellular computing device, and a wearable computing device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
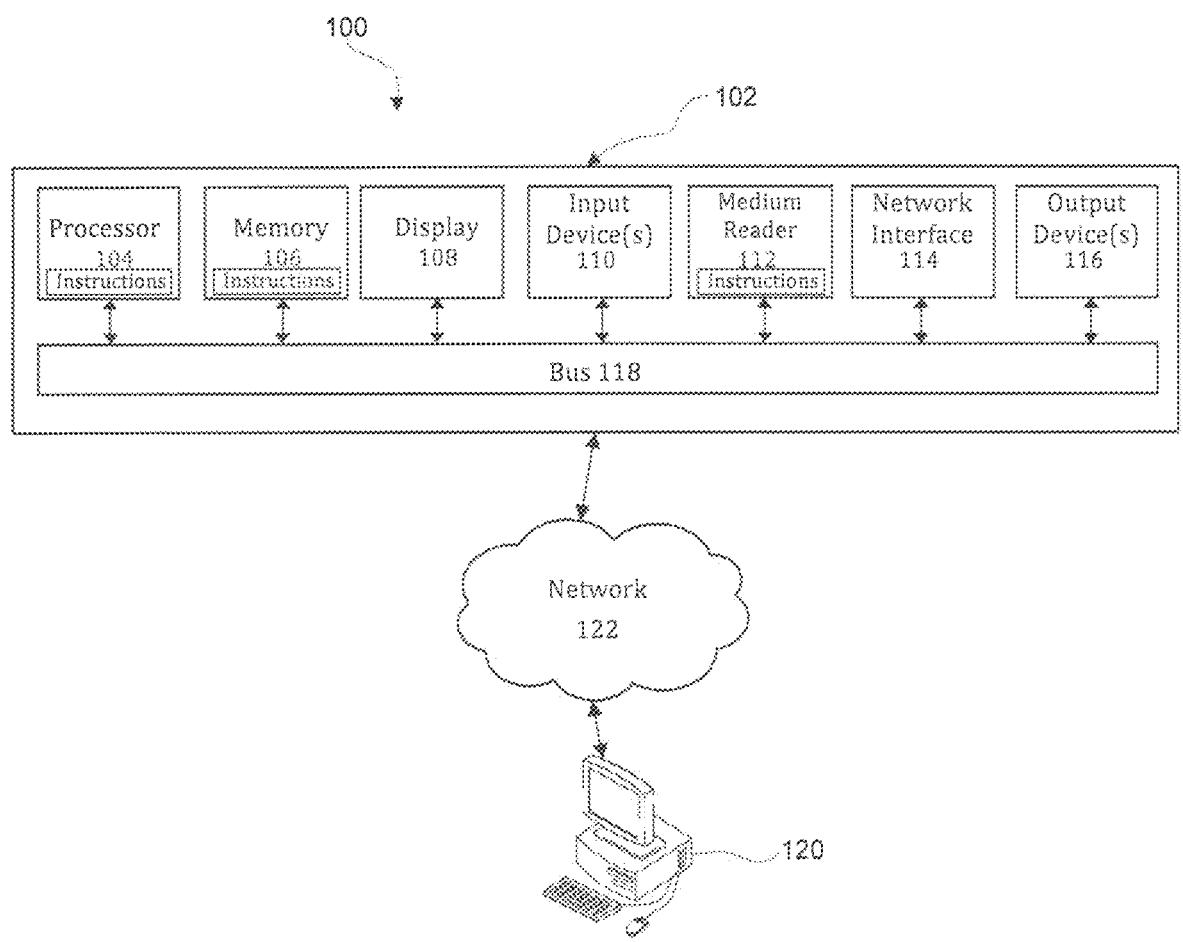
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for generating codes that correspond to accounts associated with a digital wallet.

Figure 2:
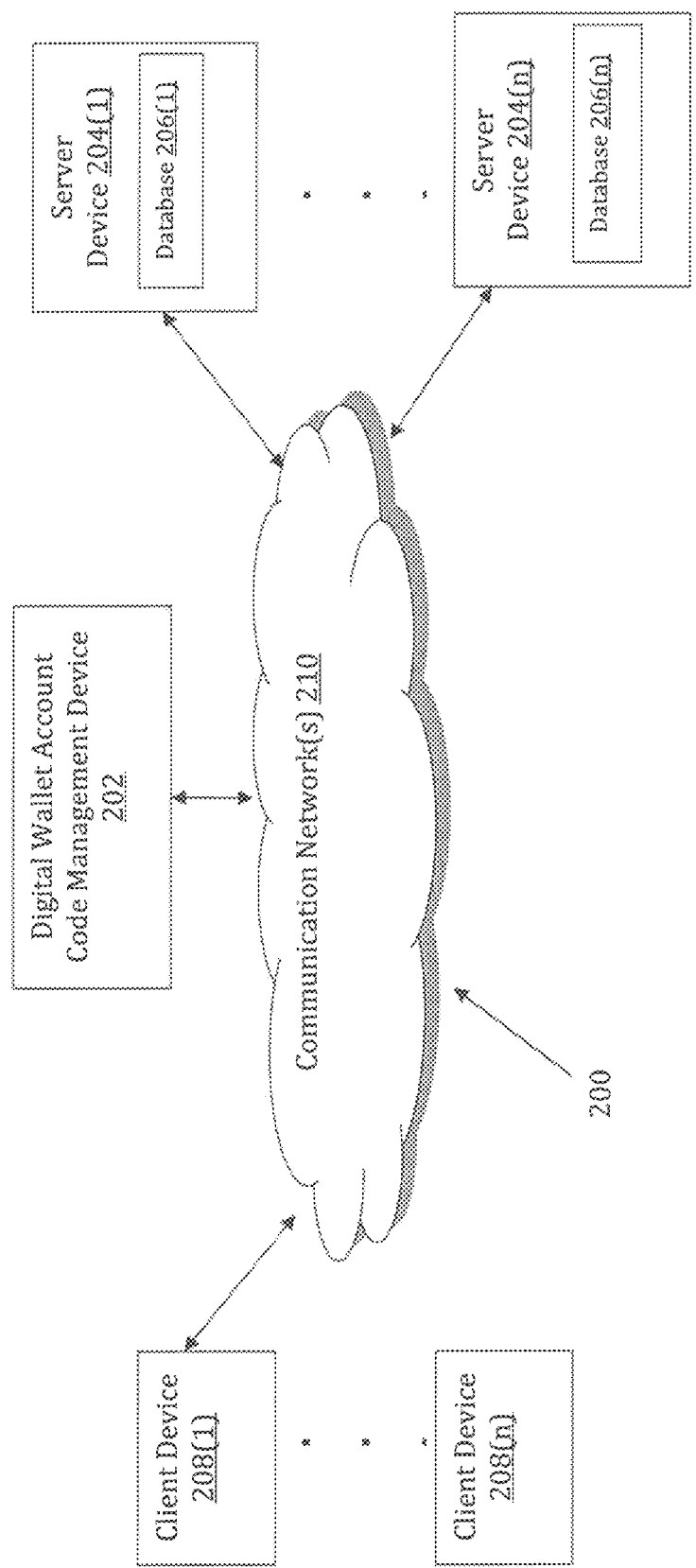
FIG. 2 illustrates an exemplary diagram of a network environment.

Referring to FIG. 2, a schematic of an exemplary network environment 200 for implementing a method for generating codes that correspond to accounts associated with a digital wallet is illustrated. In an exemplary embodiment, the method is executable on any networked computer platform, such as, for example, a personal computer (PC).

The method for generating codes that correspond to accounts associated with a digital wallet may be implemented by a Digital Wallet Account Code Management (DWACM) device 202. The DWACM device 202 may be the same or similar to the computer system 102 as described with respect to FIG. 1. The DWACM device 202 may store one or more applications that can include executable instructions that, when executed by the DWACM device 202, cause the DWACM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DWACM device 202 itself, may be located in virtual server(s) running in a cloud-based computing environment rather than being tied to one or more specific physical network computing devices. Also, the application(s) may be running in one or more virtual machines (VMs) executing on the DWACM device 202. Additionally, in one or more embodiments of this technology, virtual machine(s) running on the DWACM device 202 may be managed or supervised by a hypervisor.

In the network environment 200 of FIG. 2, the DWACM device 202 is coupled to a plurality of server devices 204(1)-204(n) that hosts a plurality of databases 206(1)-206(n), and also to a plurality of client devices 208(1)-208(n) via communication network(s) 210. A communication interface of the DWACM device 202, such as the network interface 114 of the computer system 102 of FIG. 1, operatively couples and communicates between the DWACM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DWACM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DWACM devices that efficiently implement a method for generating codes that correspond to accounts associated with a digital wallet.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DWACM device 202 may be a standalone device or integrated with one or more other devices or apparatuses, such as one or more of the server devices 204(1)-204(n), for example. In one particular example, the DWACM device 202 may include or be hosted by one of the server devices 204(1)-204(n), and other arrangements are also possible. Moreover, one or more of the devices of the DWACM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DWACM device 202 via the communication network(s) 210 according to the HTTP-based and/or JavaScript Object Notation (JSON) protocol, for example, although other protocols may also be used.

The server device's 204(1)-204(n) may be hardware or software or may represent a system with multiple servers in a pool, which may include internal or external networks. The server devices 204(1)-204(n) hosts the databases 206(1)-206(n) that are configured to store data that relates to user accounts associated with a digital wallet and administrative data associated with pooled accounts that correspond to multiple users.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DWACM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DWACM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DWACM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DWACM device 202, the server devices 204(1)-204(n), or the client devices 208(1)-208(n), for example, may be configured to operate as virtual instances on the same physical machine. In other words, one or more of the DWACM device 202, the server devices 204(1)-204(n), or the client devices 208(1)-208(n) may operate on the same physical device rather than as separate devices communicating through communication network(s) 210. Additionally, there may be more or fewer DWACM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
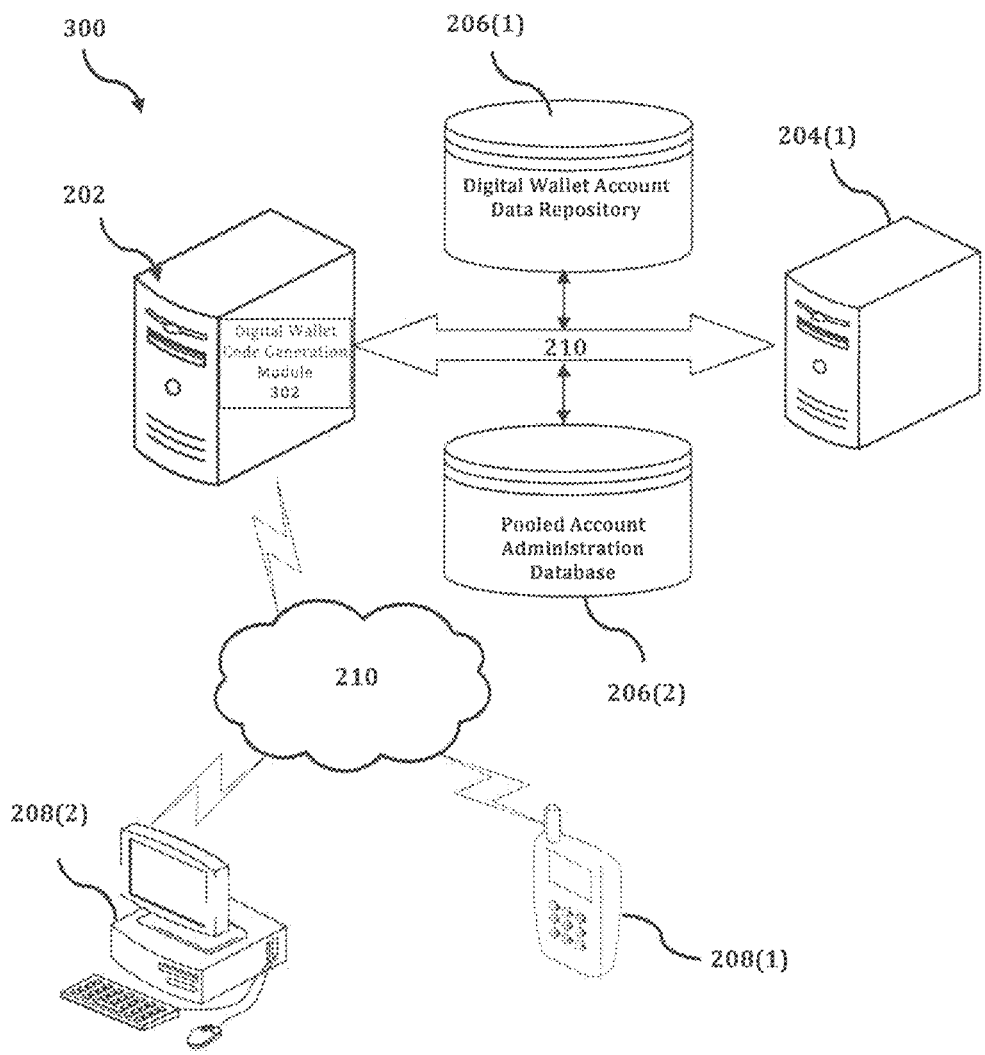
FIG. 3 shows an exemplary system for implementing a method for generating codes that correspond to accounts associated with a digital wallet.

The DWACM device 202 is described and shown in FIG. 3 as including a Digital Wallet Code Generation (DWCG) module 302, although it may include other rules, policies, modules, databases, or applications, for example. As will be described below, the DWCG module 302 is configured to implement a method for generating codes that correspond to accounts associated with a digital wallet.

DWCG module 302 as used herein can be any implementation of computer software, hardware, or combination thereof operable to execute programmed instructions. In exemplary embodiments, DWCG module 302 may be part of client devices 208(1)-208(n), such as a local application or instructions operable to be executed by the processor and memory of the client devices 208(1)-208(n). In other embodiments, DWCG module 302 is hosted on a remote server, or similar remote computing device, and accessed by client devices 208(1)-208(n) remotely over an Internet connection. Client devices 208(1)-208(n) may be configured to communicate with DWCG module 302 to generate hash values.

An exemplary process 300 for implementing a mechanism for generating codes that correspond to accounts associated with a digital wallet by utilizing the network environment of FIG. 2 is shown as being executed in FIG. 3. Specifically, a first client device 208(1) and a second client device 208(2) are illustrated as being in communication with DWACM device 202. In this regard, the first client device 208(1) and the second client device 208(2) may be "clients" of the DWACM device 202 and are described herein as such. Nevertheless, it is to be known and understood that the first client device 208(1) and/or the second client device 208(2) need not necessarily be "clients" of the DWACM device 202, or any entity described in association therewith herein. Any additional or alternative relationship may exist between either or both of the first client device 208(1) and the second client device 208(2) and the DWACM device 202, or no relationship may exist.

Further, DWACM device 202 is illustrated as being able to access a Digital Wallet Account Data Repository 206(1) and a Pooled Account Administration Database 206(2). The DWCG module 302 may be configured to access the database for generating codes that correspond to accounts associated with a digital wallet.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DWACM device 202 via broadband or cellular communication. Of course, these embodiments are merely exemplary and are not limiting or exhaustive.

Upon being started, the DWCG module 302 executes a process for generating codes that correspond to accounts associated with a digital wallet. An exemplary process for generating codes that correspond to accounts associated with a digital wallet is generally indicated at flowchart 400 in FIG. 4.

Figure 4:
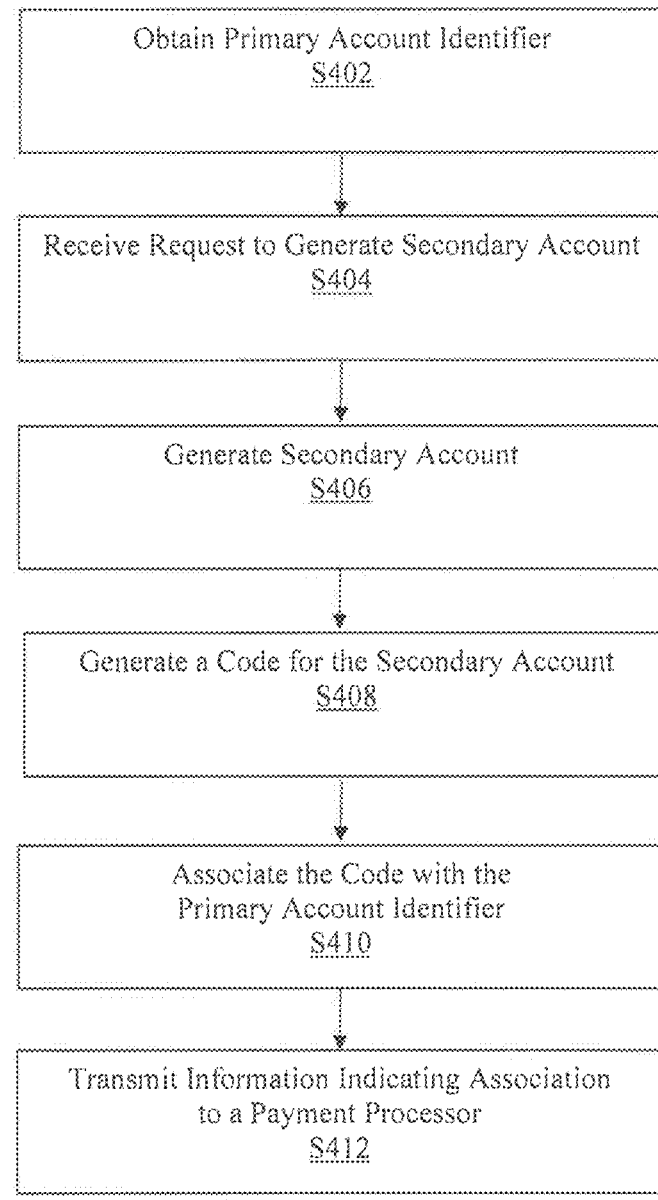
FIG. 4 is a flowchart of an exemplary process for implementing a method for generating codes that correspond to accounts associated with a digital wallet.

In process 400 of FIG. 4, at step S402, a user's primary account identifier is obtained. A user's primary account identifier may be any combination of numbers, alphanumeric text, or symbolic codes that represents a user's account (i.e., any account owned by the user and administered by a financial institution). In an exemplary embodiment, the user's primary account identifier may correspond to a user's bank account and may be received through an input at the user device, such as, for example, any one of a smart phone, tablet, computer, smart watch, or similar digital device operable to communicate with other digital devices and/or connect to the Internet.

At step S404, a request is received from the user to generate at least one secondary account. Then, at step S406, at least one account is generated. The user may request one or several accounts, in accordance with an exemplary embodiment. In an exemplary embodiment, the secondary account may be a subset of the main account, as provided by the user, and as a result, the secondary accounts may become a part of the user's main account with the user's financial institution. In another exemplary embodiment, the user's secondary accounts may be delineations or categories generated within the digital wallet system in accordance with the present disclosure. Such delineations or categories separate the user's funds within the digital wallet system only, and do not affect the user's main account with the user's financial institution. In this aspect, the generated secondary account, and associated secondary account information, may be stored on the user device according to previously described storage processes and storage media.

At step S408, a code representing the at least one secondary account is generated. In an exemplary embodiment, DWCG module 302 utilizes a hashing algorithm that uses a user's account information as an input and generates a secure account identifier or hashing value based on the input account information. As used herein, the values returned from the hashing algorithm may be referred to as hash values, hash codes, digests, or hashes. Similarly, a hashing algorithm may also be referred to as a hashing function. As used herein, a hashing algorithm may be an algorithm that receives an input string of any size and produces an output string of a fixed size, for example 8 characters. In an exemplary embodiment, the hashing algorithms may include secure hash algorithms (SHA), such as, for example, any one or more of SHA-0, SHA-1, SHA-2, SHA-3, or the like. In some exemplary embodiments, input and output strings are alphanumeric; however, in other exemplary embodiments, the input and output strings may comprise symbols or other special characters. Hashing algorithms are generally collision-resistant, which reduces the probability that the same string may be generated for different accounts. In some exemplary embodiments, the hash values may be created using one-way functions that may not be reversible.

At step S410, the generated code is associated with the at least one primary account identifier obtained from the user. Based on the association between the generated code and the primary account identifier, the generated code may be usable in place of the user's bank account. In an exemplary embodiment, the generated code, or hash value, may be connected to the user's bank account via an entry in a data table of accounts or as an entry into any other applicable data format. In another exemplary embodiment, the data table of accounts, or any other applicable data format, may be stored on one of several connected devices to include, but not limited to, distributed ledgers or cloud storage.

In another exemplary embodiment, DWCG module 302 may be further configured to generate more than one hash value associated with a user's primary account. For example, the multiple hash values may be represented as separate secondary accounts. The secondary accounts operate as individual accounts but are each associated with the primary account. Each secondary account has a unique hash value. In some exemplary embodiments, secondary accounts may be given custom names or given use-specific tags such as street performing, pizza delivery, miscellaneous payments, etc. In another exemplary embodiment these names or tags may be private (i.e., only visible to the user), semi-private (i.e. visible to certain users such as users in a trusted "friends" list), or public (i.e., visible to all users of the digital wallet system and associated platforms). The visibility of each secondary account may vary based on the user settings associated with the secondary account. For instance, when a user wants an account to receive money from a friend, then the user may make available certain identifiable information with the account so that the friend may easily identify the user. In another secondary account, the same user may wish to only be identified by the generated hash value, for anonymous transactions. In another exemplary embodiment, DWCG module 302 may be further configured to generate more than one hash value associated with a user's secondary account. For example, the multiple hash values may be represented as separate tertiary accounts to the secondary account. In another exemplary embodiment, multiple hash values may be generated as separate subsequent accounts to tertiary accounts and so forth to infinitum. For example, a user who works two waiter jobs may create multiple hash values for tertiary waiter accounts (i.e., waiter at restaurant 1 and waiter at restaurant 2) to the user's secondary waiter account.

At step S412 information that indicates the association between the generated code and the at least one primary account identifier is transmitted to a payment processor. In an exemplary embodiment, the association information may be generated on the disclosed system and transmitted to the user's financial institution. When payment processing is completed at the user's financial institution, then the association information at the user's financial institution may be used to correlate payments and ensure transaction accuracy. In another exemplary embodiment, the association information may be generated and stored on the disclosed system. When payment processing is completed on the disclosed system, then the stored association information may be used to correlate payments and ensure transaction accuracy.

In another exemplary embodiment, the bank account may be any account that is administered by a financial institution for storing funds. The bank account may be accessible through an electronic portal over a network or similar configuration. In another exemplary embodiment, the bank account may be configured to operate with additional digital wallets for storing digital currency such as Bitcoin, Ethereum, Ripple, or the like. In other exemplary embodiments, digital currencies may be associated with a digital wallet system without the need for a bank account.

In another exemplary embodiment, the DWCG module 302 may be configured to utilize a hash function to generate at least one hash value associated with a user account. The user account may be a financial account accessible by an account number and/or routing number. In another exemplary embodiment, the user account may be a checking account at a bank or similar financial institution. The user account may be linked to a digital wallet system by causing one or more deposits into the user account of some predetermined amount of money. The one or more deposits are then withdrawn from the user account after a preset amount of time, (i.e., minutes, hours, days) and input into the digital wallet system. In another exemplary embodiment, the order in which the deposits and withdrawals are performed must match in order to authenticate the user. Digital wallet system may be operable to receive funds before an authentication procedure may be completed, but the funds will not be available for transfer to the bank account until authentication requirements are satisfied.

Figure 5:
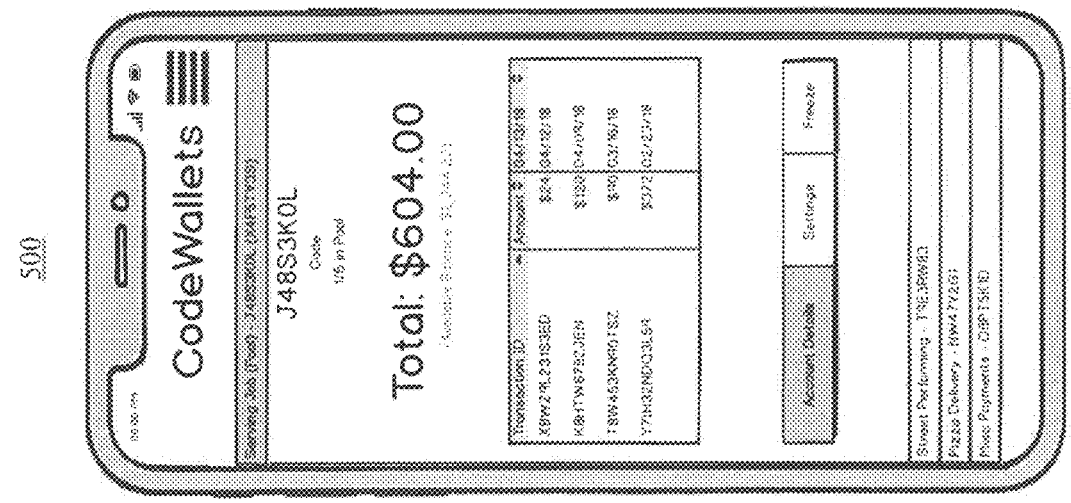
FIG. 5 illustrates graphical user interfaces for creating single and/or pooled secondary accounts represented by codes, in accordance with an exemplary embodiment.
Figure 5:
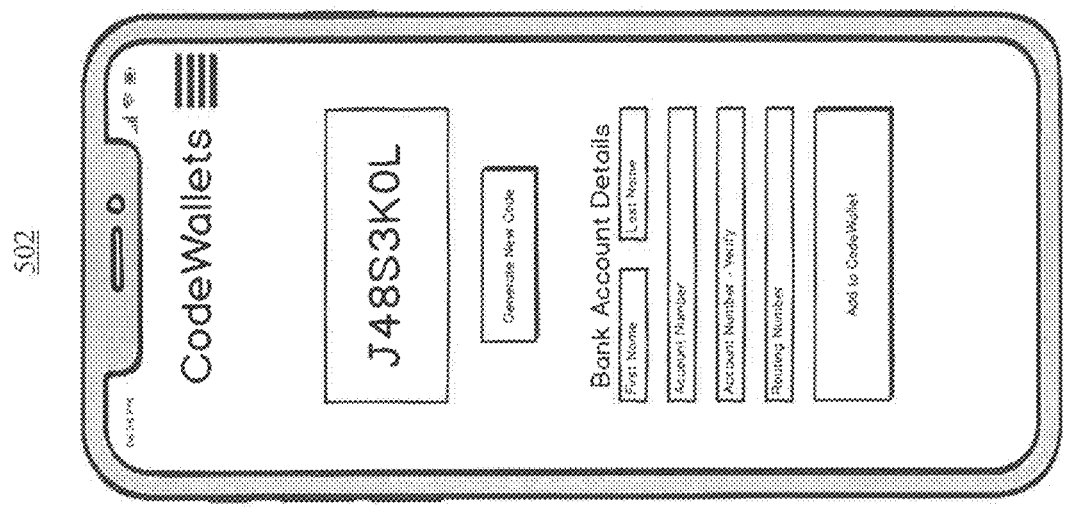
Figure 5:
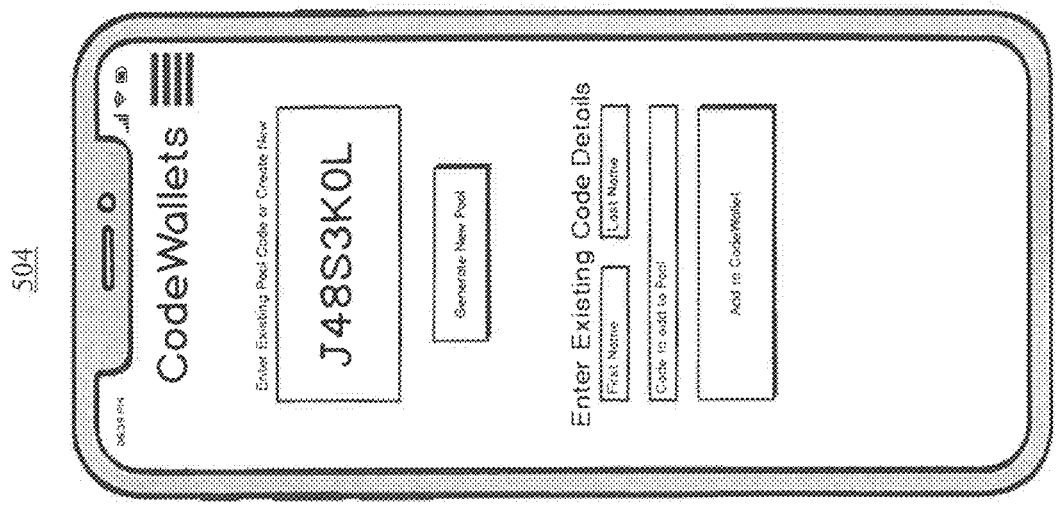

FIG. 5 illustrates graphical user interfaces for creating single and/or pooled secondary accounts represented by codes, in accordance with an exemplary embodiment. The graphical user interfaces shown in FIG. 5 have headers showing an exemplary name for the disclosed system as "CodeWallets". As will be appreciated by a person of ordinary skill in the art, the presented exemplary name is provided for illustrative purposes only and should not be read as limiting for the current disclosure. For simplicity of explanation, the disclosed system may further be referenced as "CodeWallets" or "the application".

In an exemplary embodiment, graphical user interface 500 illustrates an exemplary "Account Details" page of the CodeWallets application. The account details page in graphical user interface 500 provides an overall look at a user's CodeWallets account. The graphical user interface 500 further shows two other tabs accessible by the user titled "Settings" and "Freeze". In no particular order, the page provides an overview of generated codes currently associated with a pooled account. Here, the illustration shows the code for the pooled account, that a user's code is currently in a pooled account titled "Serving Job", and that the user's code is one of six codes currently within the pooled account. Next, the illustration shows a total amount the user currently has in the CodeWallets application as well as an available balance from the user's primary account. The illustration then provides a summary, or log, of the user's past transactions which may include the codes of other participants in the transaction, the amount of the transactions, and/or the date the transaction took place. The graphical user interface 500 also provides an overview of a plurality of codes and corresponding secondary accounts generated by the user (i.e., street performing, pizza delivery, misc. payments).

The illustrations in FIG. 5 further provides exemplary graphical user interfaces for the creation of an account within the CodeWallets application. In an exemplary embodiment, graphical user interface 502 shows an exemplary interface for the creation of a new secondary account. The illustrated graphical user interface shows a button for receiving a user input to generate a new code and a display showing the generated code. Graphical user interface 502 also provides text input areas for the user to input primary account information of the account the user would like to associate with the newly generated code. The text input areas include fields for the user's name, account number, a verification of the account number, and routing number. The user may also be provided a button to add the generated code and primary account information to the CodeWallets application.

In another exemplary embodiment, graphical user interface 504 shows an exemplary interface for the creation of a new pooled secondary account. The illustrated graphical user interface shows a button for receiving a user input to generate a new code for a pooled account and a display showing the generated code. The display showing the generated code may also receive user input of an existing pooled account code the user would like to use instead of creating a new pooled account code. Graphical user interface 504 also provides text input areas for the user to input an existing account code to be added to the newly generated pooled account or an existing pooled account. The text input areas include fields for the user's name as well as a field for the code the user would like to add to the pooled account. The user may also be provided a button to add the generated pooled account code, the existing pooled account code, and/or the account code the user would like to add to the pooled account to the CodeWallets application.

In another exemplary embodiment, the generated code, or hash value, may be used for a single transaction, for example, a one-time payment for a souvenir at a stadium, or in another exemplary embodiment, may be saved and reused as a user generated account. In another exemplary embodiment, assigned hash values may vary according to user preference. Assigned hash values may be set to refresh after a predefined period of time (i.e., every 30 days). In another exemplary embodiment, a user may set different account hash values to refresh after different periods of time, for example, refresh Account A hash value every 30 days, and refresh Account B hash value every 6 months. In another exemplary embodiment, a user may set an account hash value to refresh after a certain number of transfers or deposits.

Figure 6:
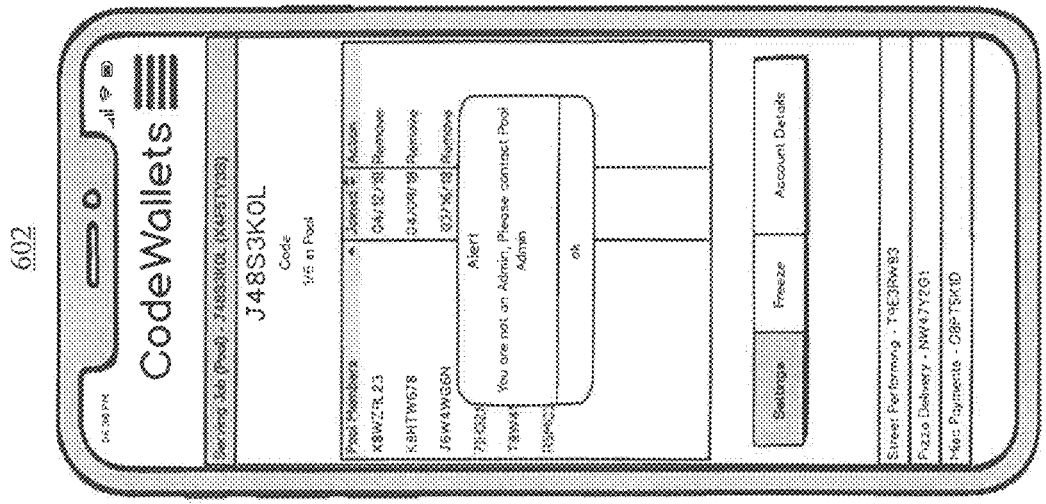
FIG. 6 illustrates graphical user interfaces for editing and managing pooled secondary accounts represented by codes, in accordance with an exemplary embodiment.
Figure 6:
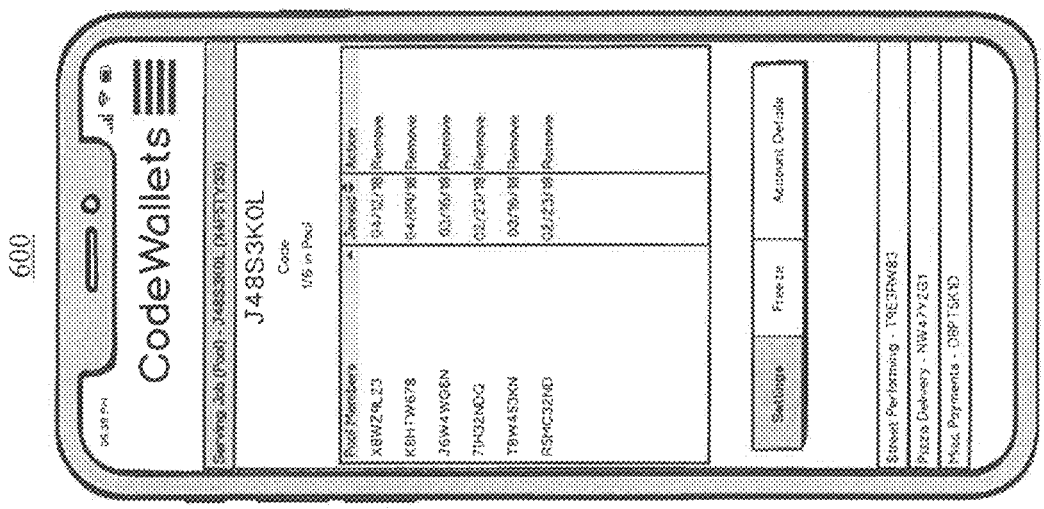

FIG. 6 illustrates graphical user interfaces for editing and managing pooled secondary accounts represented by codes, in accordance with an exemplary embodiment. In an exemplary embodiment, multiple users and/or user devices may be associated with a collective account or "pooled" account. Graphical user interface 600 illustrates the "settings" page of the CodeWallets application where a user may adjust pooled account settings. The settings page of the CodeWallets application is similar to the account details page previously described. In addition to what has already been described previously, the settings page includes a display of a plurality of pooled account members, dates of when the members joined the pooled account, and/or respective actions performable on the plurality of pooled account members. In another exemplary embodiment, an action to remove a respective member from the pooled account may be provided on the display.

In another exemplary embodiment, only a pooled account administrator may access the pooled account settings and make changes. A person may be granted administrator rights through various ways including, but not limited to, administrator rights given to the person who generated the pooled account, administrator rights given via a general consensus by pool members, shared administrator rights given by another administrator, and/or the passing of administrator rights from one administrator to another. Graphical user interface 602 illustrates an alert notification received by a user attempting to make changes to a pooled account when the user does not have administrative rights. The provided alert may be a visual alert notifying the user that administrative rights are required to make the desired changes and, when the desired changes are still desired, to contact the pooled account administrator. The visual alert may also be accompanied by an audible alert. In another exemplary embodiment, an alert that a member may be attempting to make changes to the pooled account may be provided to the pooled account administrator.

Figure 7:
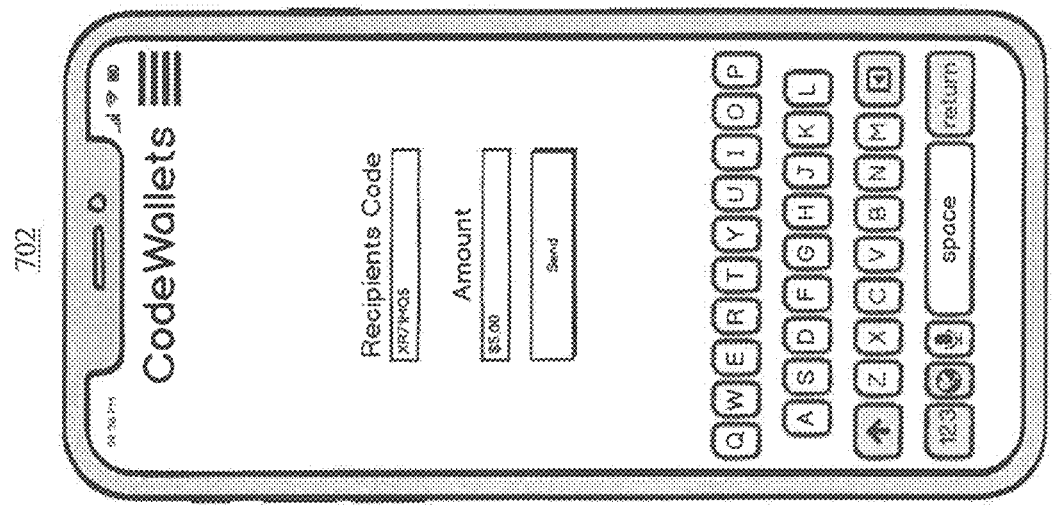
FIG. 7 illustrates graphical user interfaces for sending and receiving money from single and/or pooled secondary accounts represented by codes, in accordance with an exemplary embodiment.
Figure 7:
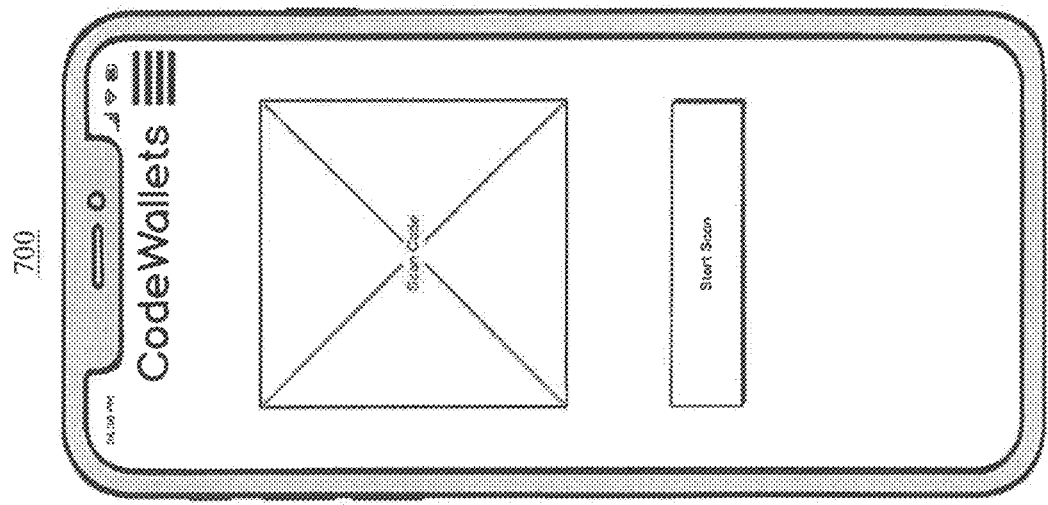

FIG. 7 illustrates graphical user interfaces for sending and receiving money from single and/or pooled secondary accounts represented by codes, in accordance with an exemplary embodiment. In an exemplary embodiment, graphical user interface 700 illustrates a method to retrieve a code by scanning the code displayed on the device of another user. In another exemplary embodiment, the code may be the generated code, generated hash value, or other account identifiers. The exemplary interface provides a display area wherein the user may see a preview of the code to be scanned to aid the user in proper alignment of the code. It will be appreciated by a person of ordinary skill in the art that one or more cameras of a user device may be used to capture the preview image, either in real-time or as a still image, of the code displayed to the user as well as read the displayed code. In another exemplary embodiment, the displayed code to be read may include a bar code, QR code, or the like configured to initiate a preset transfer to an account. Once the user is satisfied that the displayed preview includes the displayed code to be read, the interface provides a button to receive an input from the user to start the scanning of the displayed code. It should be appreciated by a person of ordinary skill in the art that the button provided by the interface may be presented before the presentation of the display area, together with the presentation of the display area, or after the presentation of the display area. In another exemplary embodiment, the code obtained from a scan may be used to initiate a payment to the other user or be used to imitate a request for payment from the other user.

In another exemplary embodiment, graphical user interface 702 illustrates a method to retrieve a code by manually entering the code displayed on the device of another user. Graphical user interface 702 provides text input fields wherein the user may manually type in the recipient's code as well as the amount the user would like to send to the other user. In another exemplary embodiment, the amount to send may be in US dollars or may be selectable by a user; for example, in Euros or Bitcoin. Once the user is satisfied with the text input of the recipient's code as well as the amount the user would like to send, the interface provides a button to receive an input from the user to initiate the transaction. It should be appreciated by a person of ordinary skill in the art that the button provided by the interface may be presented before the presentation of the display area, together with the presentation of the display area, or after the presentation of the display area. This exemplary embodiment illustrates a method to retrieve a code from a recipient so that a user may send money to the recipient; however, it should be appreciated that in another exemplary embodiment, the code obtained from a manual user input may be used to initiate a payment to the other user or be used to imitate a request for payment from the other user.

In another embodiment, the user may further customize a transfer, varying the amount transferred, or leave a note. For example, a street performer may have a sign that is situated by a guitar box, and instead of throwing in some change, a passerby may just scan the performer's code and initiate a transfer. Because the transfer accounts are each only identified by their hash values, the transaction remains anonymous.

Figure 8:
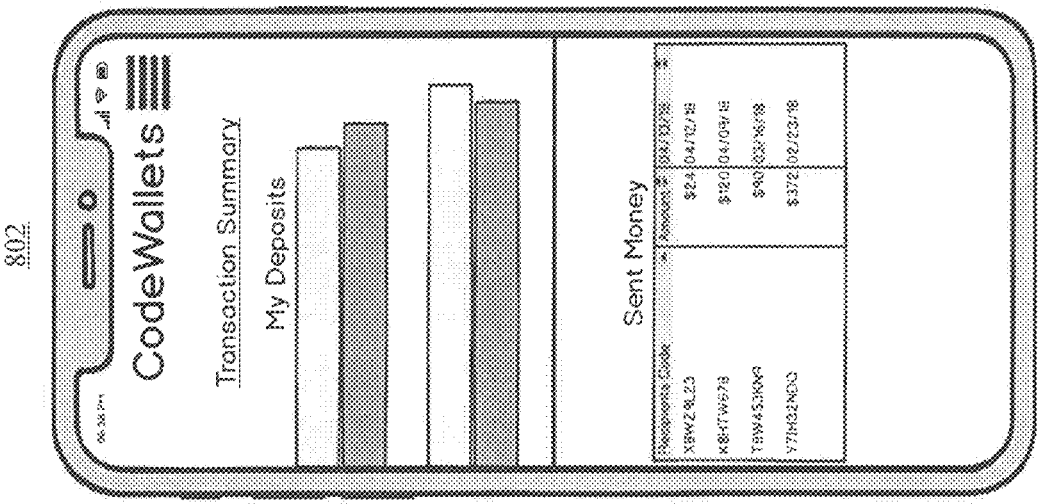
FIG. 8 illustrates graphical user interfaces for monitoring single and/or pooled secondary accounts represented by codes, in accordance with an exemplary embodiment.
Figure 8:
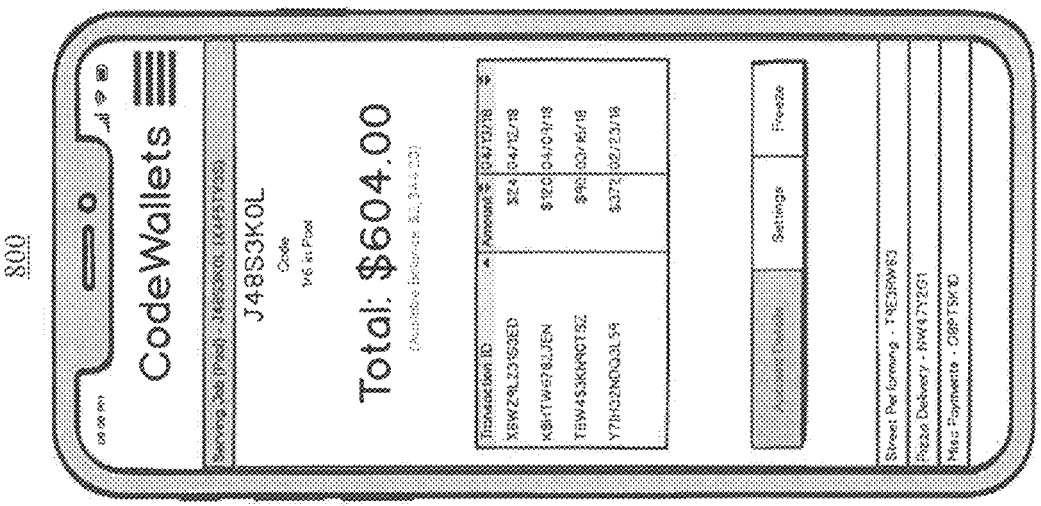

FIG. 8 illustrates graphical user interfaces for monitoring single and/or pooled secondary accounts represented by codes, in accordance with an embodiment. Graphical user interface 800 illustrates an account details page of the CodeWallets application. The illustrated account details page is similar to the account details page previously presented in FIG. 5.

In an exemplary embodiment, graphical user interface 802 illustrates a transaction summary page accessible to the user through a selection of the displayed recent transactions on the account details page. In another exemplary embodiment, the transaction summary page may be accessible through the selection of a dedicated "Transaction Summary" button on the account details page. The transaction summary page includes a graphical display showing the user's credits and deposits for a period of time from a plurality of secondary accounts in the CodeWallets application. Here, a graphical display of a bar graph is provided showing a bar for user credits and a bar for user debits. It will be appreciated by a person of ordinary skill in the art that other types of visual data representations may be used including, but not limited to, a pie chart, a line graph, a histogram, a pictogram, a scatter plot, and/or a bubble chart. Similarly, a displayed period of time may also be adjustable based on user preference. In another exemplary embodiment, the displayed period of time may be configured to display real-time information about the account and update as funds are debited or credited. Likewise, the inclusion of the plurality of secondary accounts in the CodeWallets application may be adjustable based on user preference to include any combination of secondary accounts as well as all of the user's secondary accounts. In another exemplary embodiment, the transaction summary page enables a graphical view of transactions for a single secondary account or a plurality of secondary accounts—including pooled secondary accounts. Graphical user interface 802 also displays a summary, or log, of the user's past transactions which may include the codes of other participants in the transaction, the amount of the transactions, and/or the date the transactions took place. In another exemplary embodiment, a transaction specific code, or hash value, may be generated and stored in the summary, or log, of the user's past transactions. The transaction specific hash value may include information relating to the recipient code or hash value, the sender code or hash value, and the amount transferred.

Figure 9:
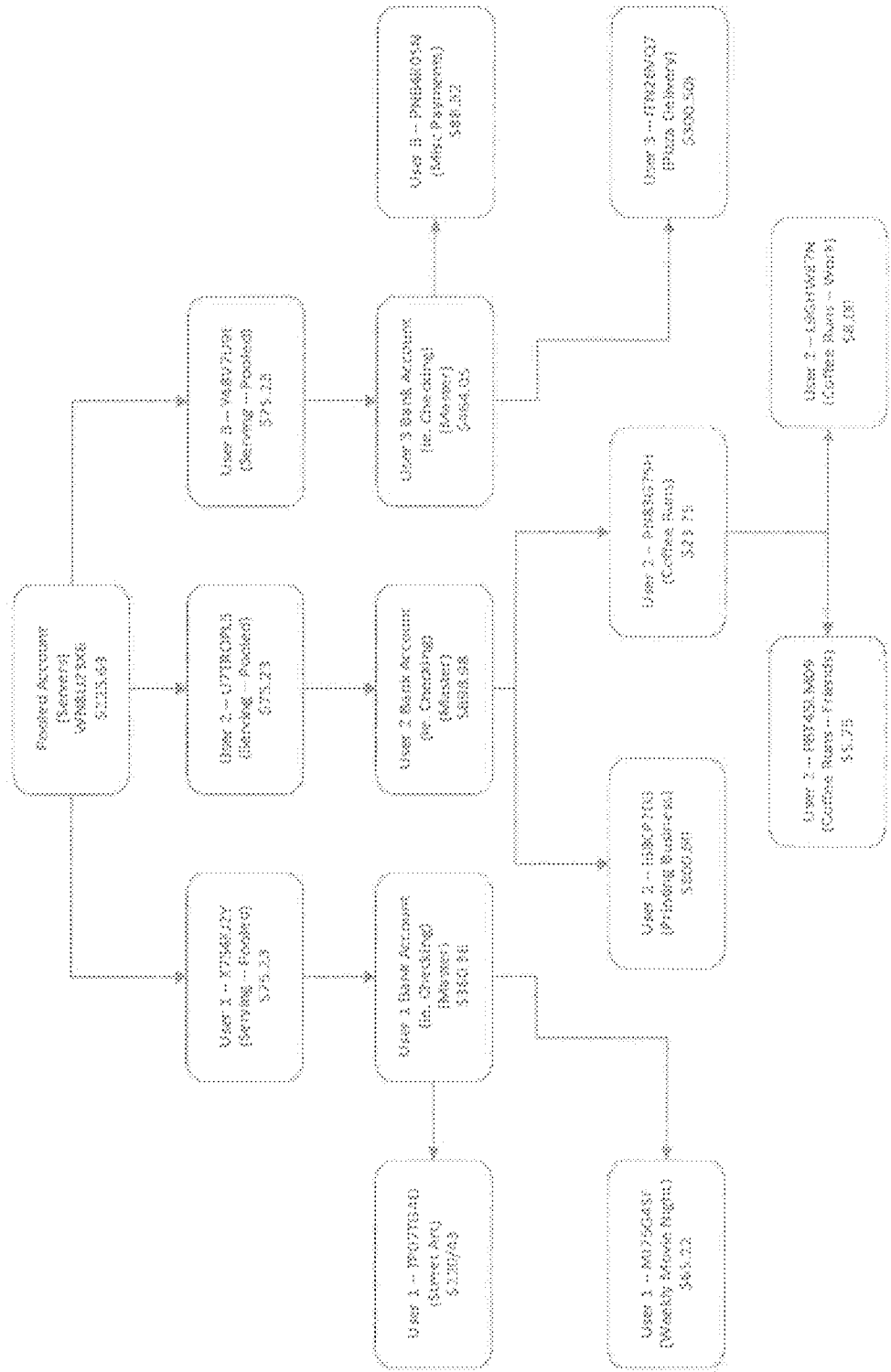
FIG. 9 is a flow diagram of an exemplary process for implementing a method for generating codes that correspond to accounts associated with a digital wallet.

Transfer flow diagram 900 in FIG. 9 illustrates an exemplary process for implementing a method for generating codes that correspond to accounts associated with a digital wallet. In an exemplary embodiment, multiple users or user devices may be associated with a collective account or "pooled" account. FIG. 9 shows an exemplary transfer of funds in a pooled account of a digital wallet. Transfer flow diagram 900 shows the input and output related to three hypothetical users (User 1, User 2, and User 3), who share a pooled account as servers at a restaurant, tavern, or the like. As shown in transfer flow diagram 900, the three hypothetical users share a singled pooled account for money collected as tips, or similar earnings. In another exemplary embodiment, the pooled account has an administrator, admin, creator, or the like, responsible for the creation and settings associated with the account. Administrator privileges may be assigned automatically to the user account that generated the pool or may be assigned by the administrator to a different account.

In an exemplary embodiment, pooled accounts have their own unique codes, or hash values, that customers can interact with and give tips as they receive products or services. For example, a sign at each table may instruct customers to send tips to hash value WNBU23X6, which is the hash value assigned to a pooled account. In another exemplary embodiment, a QR code, barcode, or the like, may be scanned to initiate a transfer to the pooled account. The funds sent to the pooled account may be distributed equally to the User 1 pool account, the User 2 pool account, and the User 3 pool account.

In another exemplary embodiment, unequal allotments of the pooled funds can be set up. For example, the leader of a street performing group may be setup to receive a larger portion relative to the other members of the group. A user account with administrator privileges may determine allocation percentages for the members of the pool, add or delete members of the pool, or freeze access to the pooled account.

In another exemplary embodiment, and administrator may establish "weighted" payments to the members of a pooled account such that each member of the pool receives a percentage of the overall distribution to the pooled account. For example, weighted payments may be used to pay different members of the pool according to hours worked, responsibility or title, items sold, etc.

An administrator may also freeze an account within the pool. For example, when one member of a pool does not show up for work, then the administrator may freeze the account for that user and enable the pool to receive and distribute funds to the remaining members of the pool. In another exemplary embodiment, an administrator may freeze the entire pooled account, and all attempted transfers to the pool would be stopped. When a pooled account is frozen by an administrator, a notification may be sent alerting the party attempting a transfer to the pool that the pool may be frozen and not accepting payments.

In another exemplary embodiment, the notification may include information about the individuals in the pool so that the party attempting the transfer may alternatively transfer funds to each individual. Each pool account has its own unique hash value assigned. As described above, user preferences may determine how much user identification information may be shown to other members of the pool or whether the hash value will serve as the only identifier.

In another exemplary embodiment, pool members may access their pooled account through a link to their primary account. For example, User 1 has access to the User 1 pool account through User 1's primary bank account. Money being received by the pool and sent to a bank account appears the same to the bank or financial institution as when the transfer is received from an individual user. Therefore, regardless of the bank or account associated with a user's bank account, the pool account distribution process remains independent from the transfers within the pool. User 1 also has two secondary accounts linked to User 1's primary bank account; a street art account and a weekly movie night account. These accounts may be generated by User 1 at any time and will be assigned their own unique hash value. In another exemplary embodiment, user generated accounts are representative of the funds allocated to them, but money may not be moved from the primary bank account. In another exemplary embodiment, user generated accounts will expire after a predetermined time. In another exemplary embodiment, the secondary accounts, such as the street art account, may be another pooled account shared with multiple users.

Similar to the multiple accounts of User 1, User 2 may have multiple accounts that feed into User 2's primary bank account. For example, as shown in FIG. 9, User 2 has a printing business account and a coffee runs account. Like User 1, User 2 may generate these accounts at their discretion and generate and delete any account associated with User 2's primary bank account. As another example, User 3 has a pizza delivery account and a miscellaneous payments account associated with User 3's primary bank account.

Accordingly, with this technology, an optimized process for generating codes that correspond to accounts associated with a digital wallet is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing information that relates to a user account, the method being implemented by at least one processor of a client device, the method comprising:
   obtaining, by the at least one processor, at least one primary account identifier from a first user;
   receiving, by the at least one processor via a graphical user interface, a request from the first user to generate at least one secondary account;
   generating, by the at least one processor, the at least one secondary account;
   applying, by the at least one processor, a predetermined tag to the at least one secondary account, the predetermined tag including a custom account name and a privacy characteristic that relates to at least one from among a private characteristic, a semi-private characteristic, and a public characteristic,
      wherein visibility of data associated with the at least one secondary account to other users is determined based on the predetermined tag;
   generating, by the at least one processor, at least one code representing the at least one secondary account,
      wherein the at least one code is usable for a transaction that requires the at least one secondary account, the transaction relating to an anonymous transaction that is identifiable by using the at least one code;
   applying, by the at least one processor, at least one refresh parameter to the generated at least one code based on a user preference, the at least one refresh parameter including an elapsed time parameter, a number of transfers parameter, and a number of deposits parameter;
   associating, by the at least one processor, the generated at least one code with the at least one primary account identifier;
   transmitting, by the at least one processor via a communication interface, information that indicates the association between the at least one code and the at least one primary account identifier to a payment processor;
   determining, by the at least one processor, whether the at least one refresh parameter applied to the at least one code is satisfied; and
   regenerating, by the at least one processor, the at least one code when the at least one refresh parameter is satisfied.

2. The method of claim 1, wherein the at least one code includes a hash value generated by using at least one Secure Hash Algorithm (SHA) that includes at least one of SHA-1, SHA-2, and SHA-3.

3. The method of claim 2, wherein the hash value is created using one-way functions that are not reversible.

4. The method of claim 1, wherein a first one of the at least one secondary account is included in a pool of accounts that correspond to different users, the pool being associated with a pool-specific code, and wherein the pool of accounts is maintained by an administrator that is authorized to disburse funds to participants, establish distribution parameters, add participants, and remove participants.

5. The method of claim 4, wherein the distribution parameters include a seniority parameter, an ownership parameter, a participation parameter, a shift type parameter, and a job title parameter.

6. The method of claim 1, further comprising:
   receiving, by the at least one processor from the first user, a request to initiate a transaction; and
   initiating, by the at least one processor, the requested transaction.

7. The method of claim 6, wherein the initiating a transaction further comprises:
   generating, by the at least one processor, a machine-readable symbol representing the at least one code, wherein the machine-readable symbol includes at least one of a bar code, a linear barcode, a two-dimensional (2-D) matrix barcode, and a Quick Response (QR) code; and
   displaying, by the at least one processor via a display screen, the generated machine-readable symbol; and
   wherein, when the transaction is completed, the method further comprises:
      receiving, by the at least one processor, a confirmation from the payment processor that the transaction is completed, wherein the confirmation includes at least one of an audible alert, a visual alert, and a notification message.

8. The method of claim 6, wherein the initiating a transaction further comprises:
   scanning, by the at least one processor via an input device, a displayed machine-readable symbol; and
   transmitting, by the at least one processor via a network module, a transaction message to the payment processor, wherein the transaction message includes the machine-readable symbol and instructions to transfer a predetermined amount of funds into the at least one secondary account; and
   wherein, when the transaction is completed, the method further comprises:
      receiving, by the at least one processor, confirmation from the payment processor that the transaction is completed, wherein the confirmation includes at least one of an audible alert, a visual alert, and a notification message.

9. The method of claim 1, wherein the client device includes at least one of a mobile computing device, a cellular computing device, and a wearable computing device.

10. A computing device configured to implement an execution of a method for providing information that relates to a user account, the computing device comprising:
   a display screen;
   a processor;
   a memory; and
   a communication interface coupled to each of the processor, the memory, and the display screen,
   wherein the processor is configured to:
      obtain at least one primary account identifier from a first user;
      receive, via the communication interface from a graphical user interface, a request from the first user to generate at least one secondary account;

generate the at least one secondary account;
apply, by the at least one processor, a predetermined tag to the at least one secondary account, the predetermined tag including a custom account name and a privacy characteristic that relates to at least one from among a private characteristic, a semi-private characteristic, and a public characteristic,
  wherein visibility of data associated with the at least one secondary account to other users is determined based on the predetermined tag;
generate at least one code representing the at least one secondary account,
  wherein the at least one code is usable for a transaction that requires the at least one secondary account, the transaction relating to an anonymous transaction that is identifiable by using the at least one code;
apply at least one refresh parameter to the generated at least one code based on a user preference, the at least one refresh parameter including an elapsed time parameter, a number of transfers parameter, and a number of deposits parameter;
associate the generated at least one code with the at least one primary account identifier;
transmit, via the communication interface, information that indicates the association between the at least one code and the at least one primary account identifier to a payment processor;
determine whether the at least one refresh parameter applied to the at least one code is satisfied; and
regenerate the at least one code when the at least one refresh parameter is satisfied.

11. The computing device of claim 10, wherein the at least one code includes a hash value generated by using at least one Secure Hash Algorithm (SHA) that includes at least one of SHA-1, SHA-2, and SHA-3.

12. The computing device of claim 11, wherein the hash value is created using one-way functions that are not reversible.

13. The computing device of claim 10, wherein a first one of the at least one secondary account is included in a pool of accounts that correspond to different users, the pool being associated with a pool-specific code, and wherein the pool of accounts is maintained by an administrator that is authorized to disburse funds to participants, establish distribution parameters, add participants, and remove participants.

14. The computing device of claim 13, wherein the distribution parameters include a seniority parameter, an ownership parameter, a participation parameter, a shift type parameter, and a job title parameter.

15. The computing device of claim 10, wherein the processor is further configured to:
  receive, via the communication interface, a request to initiate a transaction; and
  initiate the requested transaction.

16. The computing device of claim 15, wherein when the processor initiates a transaction, the processor is further configured to:
  generate a machine-readable symbol representing the at least one code, wherein the machine-readable symbol includes at least one of a bar code, a linear barcode, a two-dimensional (2-D) matrix barcode, and a Quick Response (QR) code; and
  display, via the display screen, the generated machine-readable symbol; and
  wherein, when the transaction is completed, the processor is further configured to:
    receive, via the communication interface, a confirmation from the payment processor that the transaction is completed, wherein the confirmation includes at least one of an audible alert, a visual alert, and a notification message.

17. The computing device of claim 15, wherein when the processor initiates a transaction, the processor is further configured to:
  scan, via an input device, a displayed machine-readable symbol; and
  transmit, via the communication interface, a transaction message to the payment processor, wherein the transaction message includes the machine-readable symbol and instructions to transfer a predetermined amount of funds into the at least one secondary account; and
  wherein, when the transaction is completed, the processor is further configured to:
    receive, via the communication interface, confirmation from the payment processor that the transaction is completed, wherein the confirmation includes at least one of an audible alert, a visual alert, and a notification message.

18. The computing device of claim 10, wherein the computing device includes at least one of a mobile computing device, a cellular computing device, and a wearable computing device.

* * * * *